United States Patent [19]

Sandstrom

[11] 4,094,831

[45] June 13, 1978

[54] GREEN STRENGTH OF ELASTOMERS

[75] Inventor: Paul H. Sandstrom, Tallmadge, Ohio

[73] Assignee: The Goodyear Tire & Rubber Company, Akron, Ohio

[21] Appl. No.: 734,773

[22] Filed: Oct. 22, 1976

[51] Int. Cl.$^2$ .................. C08F 8/00; C08F 224/00; C08L 7/00; C08L 63/00

[52] U.S. Cl. .................. 260/5; 260/836; 526/13; 526/16; 526/30; 526/49; 526/56; 526/273

[58] Field of Search .............. 526/273, 13, 16, 30, 526/49, 56; 260/5, 836

[56] References Cited

U.S. PATENT DOCUMENTS

| | | | |
|---|---|---|---|
| 2,839,514 | 6/1958 | Shokal et al. | 526/273 |
| 3,166,609 | 1/1965 | Wilder | 260/5 |
| 3,383,372 | 5/1968 | Spivey | 526/273 |
| 3,652,476 | 3/1972 | Fellers et al. | 526/273 |
| 3,652,523 | 3/1972 | Baker et al. | 526/273 |
| 3,872,036 | 3/1975 | Todani et al. | 260/5 |
| 3,935,375 | 1/1976 | Ichiba et al. | 526/273 |
| 3,947,523 | 3/1976 | Schaffling | 260/836 |

*Primary Examiner*—Harry Wong, Jr.
*Attorney, Agent, or Firm*—J. Y. Clowney; Daniel J. Hudak

[57] ABSTRACT

The green strength of synthetic elastomers is improved by forming interpolymers from at least one type of various synthetic elastomer forming monomers with an epoxy containing monomer having the formula:

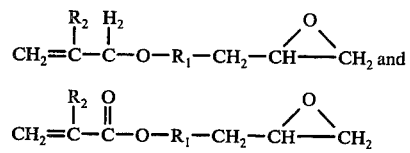

where $R_1$ contains from 0 to 8 carbon atoms and $R_2$ contains from 1 to 4 carbon atoms. Typical elastomer forming monomers include at least one conjugated diene having from 4 to 10 carbon atoms, olefins having from 2 to 14 carbon atoms along with a diene having from 4 to 6 carbon atoms, and combinations thereof. The interpolymer preferably is blended with synthetic elastomers or natural rubber (cis-1,4-polyisoprene) and utilized for various industrial uses such as tire carcasses including radial truck tire carcasses. The green strength is further improved if a small amount of an epoxy cross-linking agent is utilized. Examples of suitable cross-linking agents include monoamines and polyamines, monoanhydrides and polyanhydrides, and monocarboxylic acids, as well as polycarboxylic acids. Desirably, the interpolymer of the synthetic elastomer forming monomer and the epoxy containing monomer is blended with various types of synthetic elastomers or natural rubber in the presence of an epoxy cross-linking agent in a suitable mixing vessel such as a Banbury.

29 Claims, 2 Drawing Figures

GREEN STRENGTH OF ELASTOMERS

BACKGROUND OF THE INVENTION

The present invention relates to improving the green strength of various synthetic elastomers. More specifically, the present invention relates to obtaining improved green strength of various elastomers by forming an interpolymer therewith through the use of specific epoxy containing monomers. The green strength can be further improved by utilizing specific cross-linking agents to cross-link the interpolymers. Additionally and preferably, the present invention relates to the addition of the above-noted epoxy containing interpolymers to various synthetic elastomers or natural rubber to form blends which selectively are cross-linked with epoxy cross-linking agents wherein such blends have improved green strength.

Heretofore, although progress in the elastomer field has improved to such an extent that synthetic elastomers have supplemented or replaced natural rubber to a large extent in the fabrication of tires or other rubber products, synthetic elastomers still generally exhibit low green strength. This is true even for synthetic cis-1,4-polyisoprene. By the term "green strength" it is generally meant that property of a polymer or elastomer common in natural rubber, which contributes to the proper building conditions where multiple components are employed and which result in little or no release of relative movement of the assembled components subsequent to assembly and prior to initiation of the curing operation. Generally, green strength is measured by stress elongation, tensile strength and creep.

Among the various compounds or agents which have been utilized to improve green strength of synthetic rubber elastomers is maleic acid as set forth in U.S. Pat. No. 3,893,983, maleic anhydride with a free radical initiator as set forth in U.S. Pat. No. 3,897,403 and maleinized polyisoprene rubber composition containing a compound of the metal of groups 2 and 4 of the Periodic Table as set forth in U.S. Pat. No. 3,898,193. However, these patents do not relate to the formation of interpolymers with epoxy-type monomers and the like.

SUMMARY OF THE INVENTION

It is therefore, an object of the present invention to increase the green strength of elastomers.

It is another object of the present invention to improve the green strength of synthetic elastomers.

It is a further object of the present invention to provide improved green strength of synthetic elastomers, as above, by forming interpolymers made from at least one type of a synthetic elastomer forming monomer and from an epoxy containing monomer.

It is an additional object of the present invention to provide improved green strength of synthetic elastomers, as above, wherein said interpolymers are made according to a free radical process.

It is still another object of the present invention to provide improved green strength of synthetic elastomers, as above, wherein epoxy cross-linking agents are utilized to partially or wholly cross-link said interpolymers.

It is yet a further object of the present invention to provide improved green strength of synthetic elastomers, as above, wherein said epoxy containing interpolymers may be compounded with common compounding agents.

It is yet another object of the present invention to provide improved green strength of synthetic elastomers, as above, wherein said epoxy containing interpolymers desirably are blended with synthetic elastomers or natural rubber.

It is yet another object of the present invention to provide improved green strength of synthetic elastomers, as above, wherein said epoxy containing interpolymers and blends have improved creep.

Generally, the process for improving the green strength of synthetic elastomers comprises, forming an interpolymer from at least one type of a synthetic elastomer forming monomer and from epoxy containing monomers, said synthetic elastomer forming monomer selected from the group consisting of conjugated dienes having from 4 to 10 carbon atoms, olefins having from 2 to about 14 carbon atoms in combination with dienes having from 4 to 10 carbon atoms, and combinations thereof, said epoxy containing monomers selected from the group consisting of compounds having the formula:

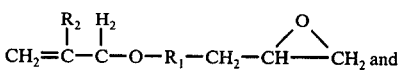

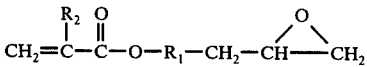

where $R_1$ contains from 0 to 8 carbon atoms and $R_2$ contains from 1 to 4 carbon atoms. Additionally, a process for improving the green strength of synthetic elastomers comprises adding epoxy cross-linking agents to the above set forth interpolymers, said cross-linking agents selected from the class consisting of monoamines, polyamines, monoanhydrides, monocarboxylic acids and polycarboxylic acids.

Another and preferred process for improving the green strength of synthetic elastomers comprises forming said epoxy containing interpolymers and blending them with synthetic elastomers and/or natural rubber and utilizing said cross-linking agents to cross-link said epoxy containing interpolymers. Desirably, the interpolymers and epoxy cross-linking agents are added along with said synthetic elastomers and/or natural rubber to a mixing vessel such as a Banbury to form a blend with the interpolymers being selectively cross-linked by said cross-linking agents.

PREFERRED EMBODIMENTS OF THE INVENTION

Figure 1:
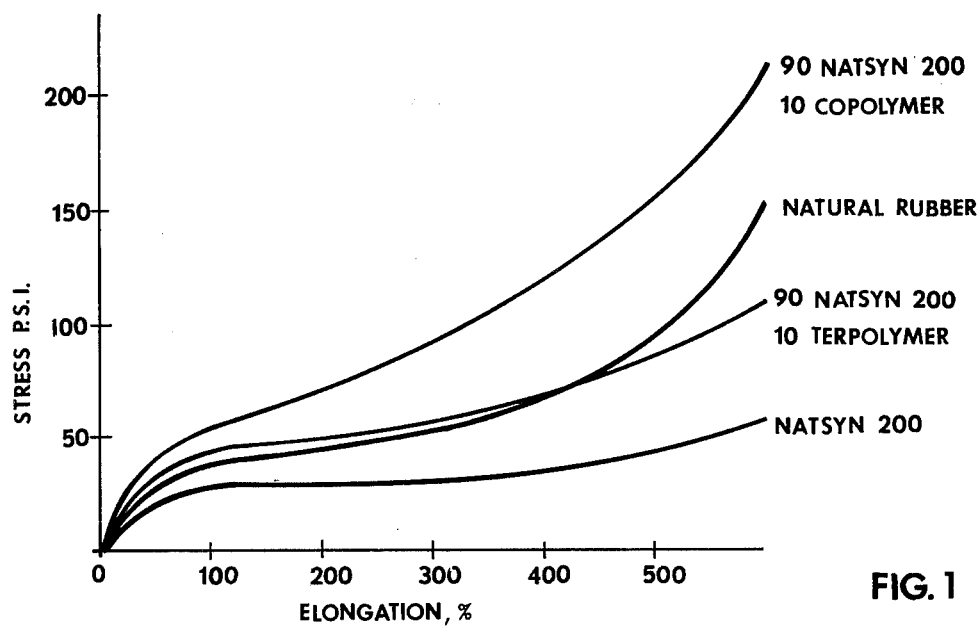
FIG. 1 is a graph showing the tensile strength of a blend of the interpolymers of the present invention compared to synthetic cis-1,4-polyisoprene and natural rubber.

According to the concepts of the present invention, synthetic elastomers having improved green strength are made by producing interpolymers from various types of synthetic elastomer forming monomers along with specific epoxy containing monomers. Generally, the interpolymerization is carried out according to a free radical process and the polymerization may include any number of different types of synthetic elastomer forming monomers as well as any number of different types of epoxy containing monomers. The synthetic elastomer interpolymer containing pendant epoxy groups may be blended with various synthetic elastomers as well as natural rubber (cis-1,4-polyisoprene). The green strength of the interpolymers or their blends with various synthetic elastomers as well as natural rubber is further improved if they are partially or wholly cross-linked as through the use of conventional epoxy cross-linking compounds such as amines, anhydrides and carboxylic acids.

The synthetic interpolymers are made from monomers generally considered by the art as capable of forming rubbertype compounds. More specifically, the synthetic epoxy containing interpolymers are made from monomers of at least one conjugated diene having from 4 to 10 carbon atoms so that diene homopolymers, copolymers, interpolymers, etc., may be utilized; monomers of at least one olefin having from 2 to 14 carbon atoms with at least one diene having from 4 to 10 carbon atoms so that copolymers, terpolymers, etc., of diene-olefin mixtures may be utilized; and combinations thereof. Specific examples of diene monomers include butadiene, isoprene, piperylene, pentadiene, hexadiene, heptadiene, octadiene, 2,3-dimethylbutadiene and the like. Preferably, diene monomers having from 4 to 6 carbon atoms are preferred. Specific examples of olefin monomers include ethene, propene, butene, pentene, hexene, heptene, octene, nonene, decene, dodecene, the various isomers thereof and the like. Additionally, the olefins also include aromatic compounds such as the vinyl substituted aromatic hydrocarbons containing from 8 to 12 carbon atoms which are preferred. Specific examples of these compounds include styrene, alpha-methylstyrene, ortho-, para-, meta-methylstyrene, ethylstyrene and the like. Of the non-aromatic olefin compounds or monomers, those containing from 3 to 6 carbon atoms are preferred.

Specific examples of copolymers made of a diene and an olefin monomer include styrene-butadiene, alpha-methylstyrene and butadiene, butadiene and propene, butadiene and butene and the like. Of course, the polymers made from dienes and olefins may include several different types of monomers of both the diene and the olefin.

Preferred elastomer monomers of the present invention include isoprene, butadiene and styrene-butadiene.

When monomers of a diene and an olefin are utilized to prepare a synthetic elastomer with the epoxy monomers, the amount of the olefin by weight to the total weight of the copolymer, terpolymer, etc., of the diene and olefin generally ranges from about 1.0 percent to about 55 percent with a more desirable range being from about 10 percent to about 40 percent. A preferred range of the olefin compound such as styrene or alpha-methylstyrene ranges from about 15 percent to about 25 percent.

According to the present invention, epoxy monomers are utilized and reacted with the synthetic elastomer forming monomers during the polymerization. The epoxy monomers have the following formula:

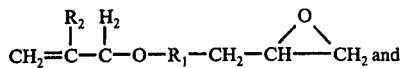 and

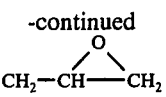

where $R_1$ contains from 0 to 8 carbon atoms and $R_2$ contains from 1 to 4 carbon atoms. More desirably, $R_1$ contains from 0 to 4 carbon atoms while preferably this group contains no carbon atoms at all. $R_2$ desirably has a low number of carbon atoms such as 1 or 2 and preferably 1. Although the $R_2$ group can contain more than 4 carbon atoms, it is undesirable since steric hindrance plays an increasing role and tends to prohibit copolymer or interpolymer formation. By the same token, if $R_1$ contains a large number of carbon atoms, steric hindrance also tends to play an important role in that the large pendant group of the epoxy monomer tends to interfere with the reaction. Preferred monomers thus include glycidyl methacrylate and 2-methylallyl glycidyl ether.

The interpolymers of the present invention are generally prepared via a free radical process utilizing conventional or common practices of procedures. That is, the method of preparation including various conditions such as temperature ranges, pressure ranges, reaction time period, free radical initiators, type of catalysts, as well as other polymerization aids or compounds which are well known to those skilled in the art. Generally, when an epoxy containing monomer is of the above set forth ester formulation, it is desirable that the reaction should occur in a solution having approximately a neutral pH. The polymerization process preferably occurs according to an emulsion or solution process. A bulk process may be utilized but is generally undesirable.

Interpolymers of the above set forth epoxy containing monomers and synthetic elastomer forming monomers have been found to give good green strength improvement wherein the interpolymer contains from about 0.5 percent to about 75 percent by weight of the epoxy containing monomer. A preferred range extends from about 1 percent to about 25 percent by weight with a highly preferred range extending from about 2 percent to about 15 percent by weight. Usually, the amount of the epoxy containing monomer in the interpolymer will generally depend upon the type of green strength improvement required, the end use of the interpolymer and the like. Of course, the interpolymer may be made from one or more different monomers of synthetic forming elastomers so that a terpolymer, tetrapolymer, etc., exists. Additionally, the interpolymer may contain more than one type of epoxy containing monomer.

The improved green strength exhibited by the epoxy containing interpolymers also imparts improved green strength to blends of the interpolymers with various synthetic elastomers or natural rubber, particularly in the presence of an epoxy cross-linking agent as plainly evident by the examples. Additionally, the interpolymers or blends thereof, especially when cross-linked, exhibit very good creep which in some instances is almost identical to that of natural rubber. Thus, they are suited for use in tires and in industrial applications such as conveyor belts, hoses, shoe soles and the like.

Further improvement in the green strength of synthetic epoxy containing interpolymers is obtained by cross-linking them with conventional epoxy cross-linking agents in a conventional manner at typical temperatures and conditions. The amount of cross-linking agent based upon 100 parts by weight of the epoxy containing interpolymer ranges from about 0.1 parts to about 2.0 parts with 0.1 parts to about 0.5 parts being preferred. Desired classes of cross-linking agents include monoamines, polyamines monoanhydrides, monocarboxylic acids and polycarboxylic acids. The mono- or polyamine compounds may be aliphatic and contain from 1 to 16 carbon atoms, cycloaliphatic and contain from 4 to 16 carbon atoms, aromatic and contain from 6 to 16 carbon atoms and combinations thereof. Considering the monoanhydride cross-linking agents, they may be an aliphatic containing a total of from 1 to 30 carbon atoms, a cycloaliphatic containing from 4 to 30 carbon atoms, an aromatic containing from 6 to 30 carbon atoms, and combinations thereof. The mono- and polycarboxylic acid cross-linking agents may be an aliphatic containing from 1 to 30 carbon atoms, an aromatic containing from 6 to 30 carbon atoms and combinations thereof. Generally, the aromatic anhydrides are desirable with the amines, either mono- or poly- being preferred. Specific examples of the various amine cross-linking agents include methylamine, dimethylamine, trimethylamine, ethylamine, diethylamine, dimethylethylamine, isopropylamine, n-propylamine, n-butylamine, sec-butylamine, amylamine, hexylamine, ethylenediamine, pentamethylenediamine, diethylenetriamine, triethylenetetramine, diethylaminopropylamine, tetraethylene pentamine and isomers thereof. Specific examples of cycloaliphatic amines include piperidine, aminoethylpiperazine, menthane diamine and metaxylyene diamine. Specific aromatic amines include m-phenylenediamine, 4,4'-diaminodiphenyl sulfone, 4,4'-methylene-bis(2-carbomethoxy aniline), 4,4'-methylene-bis aniline, diaminodiphenyldisulfide, aniline, diphenylamine, n-ethylaniline, benzylamine, 1-aminomethyl-naphthalene and the like. Examples of specific anahydrides include acetic anhydride, propionic anhydride, butyric anhydride, valeric anhydride, caproic anhydride, phthalic anhydride, hexahydrophthalic anhydride, nadic methyl anhydride, dodecenylsuccinic anhydride, nadic methyl anhydride, dodecenylsuccinic anhydride, tetrahydrophthalic anhydride, maleic anhydride, benzene tetracarboxylic anhydride and pyromellitic anhydride. Examples of specific monocarboxylic acids include acetic acid, trimethylacetic acid, butyric acid, valeric acid, caproic acid, heptanoic acid, octanoic acid, as well as other aliphatic acids and various aromatic acids such as benzoic acid, mesitoic acid, toluic acid, salicylic acid and the like. Examples of polycarboxylic acids include oxalic acid, malonic acid, succinic acid, glutaric acid, adipic acid, sebacic acid, as well as phthalic acid, isophthalic acid, terephthalic acid, pyromellitic acid and the like. Examples of specific preferred epoxy cross-linking agents or compounds include pentamethylenediamine, triethylenetetramine, diethylaminopropylamine, tetraethylene pentamine, methane diamine, 4,4'-diaminodiphenyl sulfone, 4,4'-methylenebis(2-carbomethoxy) aniline, 4,4'-methylene-bis aniline, diaminodiphenyldisulfide and benzene tetracarboxylic anhydride.

According to the preferred embodiment of the present invention, the cross-linked epoxy containing interpolymers are blended with various synthetic elastomers and/or natural rubber to form blends which have greatly improved green strength and creep. These blends desirably are made by adding the various interpolymers of the synthetic elastomer monomers and epoxy containing monomers to a mixing vessel such as a Banbury along with various synthetic elastomers and/or natural rubber in the presence of epoxy cross-linking agents. When mixed, this produces selective cross-linking of the epoxy containing interpolymer but not the synthetic elastomer or natural rubber in the blend. The vessel may be slightly heated to speed the cross-linking reaction. Generally, the amount of cross-linking agents utilized for the blend is greater than for mixtures containing solely the interpolymers and may vary from about 0.5 to about 10 parts per 100 parts of the blend which includes epoxy containing interpolymers as well as the synthetic elastomers and/or natural rubber. A preferred range extends from about 0.5 to about 2.0 parts per 100 parts of the blend. Additionally, the epoxy containing interpolymer may be in the form of a latex solution and can be mixed with an emulsion of the synthetic blend polymer such as polybutadiene, a copolymer of styrene and butadiene, nitrile rubber, and the like. The latex may be cross-linked by the cross-linking agents of the present invention with the resulting cross-linked epoxy containing interpolymers when isolated in any conventional manner as by coagulation. Alternatively, the elastomers in the latex may be coagulated according to any conventional method and then cross-linked by the cross-linking agents of the present invention in a mixing vessel such as a Banbury.

The blended elastomer or the already formed elastomers, which are added to the epoxy containing interpolymer to form the blend, may be made from the same monomers utilized in making the interpolymer. Thus, they may be made from dienes having from 4 to 10 carbon atoms, copolymers thereof and so forth and from diene-olefin copolymers, terpolymers and so forth wherein the olefin contains from 2 to 14 carbon atoms. Specific examples of the blend elastomers include both cis and trans polybutadiene, both cis and trans polyisoprene, polypiperylene, a copolymer of styrene and butadiene, a copolymer of alpha-methylstyrene and butadiene, a copolymer of butadiene and butene and the like. Desirably, high cis-1,4-polyisoprene and high cis-1,4-polybutadiene are preferred wherein the homopolymer contains more than 70 percent of the cis-1,4 structure. The copolymer of styrene and butadiene is also preferred.

Other blend elastomers include polydimethylbutadiene, butyl rubber, chlorinated and brominated butyl rubber, polychloroprene (neoprene), nitrile rubbers which are polymers of butadiene and acrylonitrile having ratios of the two monomers similar to the ratio of butadiene to styrene and styrenebutadiene rubber (SBR), EPDM and the polyalkenylenes. In the present invention, EPDM means an ethylene-propylene-diene-rubber containing from about 20 to about 75 weight percent of ethylene, from about 80 to about 25 percent weight of propylene and a minor portion of from about 1 to about 15 weight percent of nonconjugated dienes containing from 5 to 30 carbon atoms. Typical examples include a terpolymer of ethylene propylene and a suitable diene such as 1,4-hexadiene, dicyclopentadiene, ethylidene norbornene, or methylene norbornene. The polyalkenylenes are homopolymers of cyclomonoolefins, homopolymers of nonconjugated cyclopolyolefins, and interpolymers of cyclomonoolefins with nonconjugated cyclopolyolefins. Examples include polypentenylene which is a homopolymer of cyclopentene having from about 5 to 99 percent cis and 95 to about 1 percent trans configuration of double bonds; polyoctenylene which is a homopolymer of cyclooctene having from about 25 to about 95 percent cis and about 75 percent to about 5 percent trans configuration of double bonds; polyoctadienylene which is a homopolymer of 1,5-cyclooctadiene having from about 25 to about 85 percent cis and from about 75 to about 15 percent trans configurations of double bonds; copolymers of cyclopentene and dicyclopentadiene containing from about 10 to about 30 mole percent dicyclopentadiene; and copolymers of cyclooctene and 1,5-cyclooctadiene containing from 10 to about 50 mole percent of cyclooctadiene.

Of course, as previously noted, natural rubber, that is cis-1,4-polyisoprene which occurs naturally in nature, may also be utilized.

Preferred elastomers include synthetic high cis-1,4-polyisoprene, EPDM, styrene-butadiene rubber (SBR) and high cis-1,4-polybutadiene. By the term "high cis", it is meant that 95 percent or more of the repeating units in the polymer is in the cis configuration.

The amount of the epoxy containing interpolymer utilized in the immediately above-described blends generally can range from about 2 to about 98 percent by weight based upon the total weight of the blend with a preferred range being from about 2 percent to about 50 percent by weight.

As in the use of synthetic elastomers or natural rubber, the epoxy containing interpolymers of the present invention and the blends thereof, whether or not crosslinked, can be compounded in any conventional manner, method, or process such as on a mill or in a Banbury at common or conventional temperatures with conventional compounding agents. That is, the interpolymers and the blends thereof, whether or not crosslinked, are mixed with various conventional or typical compounds or additives well known to those skilled in the art to generally improve the strength, modulus, ease of processing, reduction of oxidation, and the like. Thus, typical amounts of various compounds such as carbon blacks, various clays, various silicas, various oils including aliphatic and aromatic oils, various anti-oxidants various accelerators such as zinc oxide, and various curing agents such as peroxide or sulfur curatives may be added and mixed. The amounts of the various compounds or additives, of course, are well known to those skilled in the art and will tend to vary as to the type and amount depending upon the desired end use of the interpolymer or blend. Of course, the various curing agents are not initiated or vulcanized during the mixing process until the interpolymers or blends thereof, whether or not crosslinked, are extruded, molded or shaped by any method into a desired form such as the carcass of a tire.

The invention will be better understood by the following examples.

EXAMPLE I

A terpolymer of butadiene, styrene, and glycidyl methacrylate (75/20/5 wt. % charge) and a copolymer of butadiene and styrene (75/25 wt. % charge) were prepared by free radical emulsion polymerization in a five-gallon reactor according to Recipe A. The polymerizations were conducted with a sodium sulfonate soap system at neutral pH (about 7) to prevent possible hydrolysis of the glycidyl methacrylate monomer. After addition of 1.25 parts of a hindered phenol type antioxidant ("Wingstay T"; T.M. The Goodyear Tire and Rubber Company) per 100 parts of rubber, the two latex batches were coagulated with barium chloride (0.5 weight % solution in water) and dried in a forced-air oven at 180° F.

RECIPE A
FIVE-GALLON REACTOR POLYMERIZATION CHARGE RECIPE

| MATERIAL | PARTS |
|---|---|
| Butadiene | 75.0 |
| Styrene | 20.0 or 25.0 |
| Glycidyl Methacrylate ("Blemmer G"; T.M. Nippon Oils and Fats Co., L.T.D.) | 0 or 5.0 |
| Water | 200.0 |
| Alkylate Sulfonate Soap ("Ultrawet K"; T.M. Arco Chemical Co.) | 2.0 |
| Alkylate Sulfonate Soap ("Ultrawet AOK"; T.M. Arco Chemical Co.) | 2.0 |
| Tertiary Dodecyl Mercaptan | 0.24 |
| Sulfuric Acid | 0.002 |
| Ferrous Sulfate Heptahydrate | 0.003 |
| Iron Chelating Agent | 0.075 |
| Sodium Formaldehyde Sulfoxylate | 0.044 |
| Paramenthane Hydroperoxide | 0.03 |

Both batches were polymerized to 60 percent conversion in about seven hours.

The terpolymer and copolymer prepared in the five-gallon reactor batches were mixed in a Brabender with several different epoxy curing agents according to Recipe B.

RECIPE B

| MATERIAL | PARTS | |
|---|---|---|
| Terpolymer or Copolymer | 100.0 | |
| Aromatic Processing Oil | 37.5 | Brabender |
| HAF Carbon Black | 82.0 | 5 min. |
| Zinc Oxide | 3.5 | 50 R.P.M. |
| Stearic Acid | 2.0 | 250° F |
| Epoxy Cross-linking Agent | as indicated | |

The compositions from Recipe B were molded in a press for 10 minutes at 300° F (149° C) using a standard tensile sheet cavity. The molded samples were cooled before removal from the press. Stress-strain properties were measured at 75° F (24° C) using a crosshead speed of 20 inches per minute (50.8 centimeters per minute) on dumbbells having a narrow cross section of 0.25 inch × 0.08 inch (0.635 cm. × 0.0318 cm.).

Table I sets forth various stress-strain data obtained from compositions prepared according to Recipe B.

TABLE I

| | | STRESS-STRAIN DATA [a] | | | | |
|---|---|---|---|---|---|---|
| SERIES[b] | ADDITIVE | phr | 100% MODULUS | 300% MODULUS | BREAK STRESS | ELONGATION, % |
| A | none | — | 81 | 52 | 24 | 500 |
| B | none | — | 140 | 240 | 240 | 750 |
| | Diaminodiphenyldisulfide | 0.1 | 230 | 700 | 830 | 400 |
| | Diaminodiphenyldisulfide | 0.5 | 330 | — | 1,340 | 300 |
| | Diaminodiphenyldisulfide | 2.0 | 600 | — | 630 | 105 |
| | Benzenetetracarboxylic Anhydride | 2.0 | 520 | — | 580 | 110 |
| | Benzoic Acid | 2.0 | 270 | — | 630 | 220 |
| C | Diaminodiphenyldisulfide [c] | 0.5 | 344 | 1,760 | 2,190 | 390 |

TABLE I-continued

| | | STRESS-STRAIN DATA [a] | | | | |
|---|---|---|---|---|---|---|
| | | | 100% | 300% | | BREAK |
| SERIES[b] | ADDITIVE | phr | MODULUS | MODULUS | STRESS | ELONGATION, % |
| | Diaminodiphenyldisulfide | 1.0 | 524 | 2,480 | 2,830 | 330 |

[a] Values shown are in psi.

[b] Series A, butadiene/styrene copolymer, ML/4 at 100° C 80, ASTM D-1646 Series B and C, butadiene/styrene/glycidyl methacrylate terpolymer, ML/4 at 100° C 63.

[c] Added on cold mill.

The data indicates that the terpolymer (Series B) in the absence of cross-linking agents exhibits considerably higher modulus values than the copolymer. This difference in modulus is further magnified by the addition of epoxy cross-linking agents to the terpolymer (Series B). Lower modulus values than these might be obtained by using smaller amounts of glycidyl methacrylate in the terpolymer to obtain better processing compositions. In Series C, the data indicates that addition of epoxy cross-linking agents under mild conditions followd by molding at elevated temperatures can produce vulcanizates having excellent tensile properties.

addition of the epoxy crosslinking agent during milling instead of during the Banbury mixing cycle also produces a smaller increase in modulus and stress at break values.

TABLE II

| | | | STRESS-STRAIN DATA [a] | | | | |
|---|---|---|---|---|---|---|---|
| | ISOPRENE/ | DIAMINO- | | | | | |
| | GLYCIDYL | DIPHENYL- | MODULUS AT | | | BREAK | |
| | METHACRY- | DISULFIDE, | ELONGATION OF | | | | ELONGA- |
| EXAMPLE | LATE,phr | phr | 100% | 300% | 500% | STRESS | TION,% |
| A (Control) | 0 | 0 | 93 | 98 | 83 | 21 | 790 |
| B | 15 | 2 | 133 | 160 | 136 | 117 | 542 |
| C | 15 | 0 | 104 | 103 | 56 | 40 | 520 |
| D | 15 | 2[b] | 110 | 108 | 94 | 50 | 793 |

[a] Values shown are in psi.

[b] Added on mill, rest of ingredients added during Banbury mixing.

EXAMPLE II

A copolymer of isoprene and glycidyl methacrylate (25/75 Wt. % charge), which was prepared using the conditions described in Example I, was added to SNR 1712 in a Banbury using the following recipe:

RECIPE C

| MATERIAL | WT. PARTS | |
|---|---|---|
| SBR 1712* | 137.5 | |
| HAF Carbon black | 82.0 | Banbury |
| Zinc Oxide | 3.5 | 5 min. |
| Stearic Acid | 2.0 | 50 RPM |
| Copolymer | 0 or 15.0 | |
| Diaminodiphenyldisulfide | 0 or 2.0 | |

*Bound styrene 23.5%; contains 37.5 parts highly aromatic processing oil for every 100 parts rubber. Manufactured by Goodyear Tire & Rubber Company.

The samples were molded and tested as described in Example I. Table II sets forth various stress-strain data obtained from the compositions prepared according to Recipe C. The data indicates that the addition of an isoprene/glycidyl methacrylate copolymer and diaminodiphenyldisulfide to SBR 1712 during Banbury mixing (Example B) produces a significant increase in modulus values and a much higher stress at break. In contrast, the addition of the copolymer in the absence of the epoxy cross-linking agent (Example C) produces a less significant increase in modulus and stress at break values. The data from Example D indicates that the

EXAMPLE III

A copolymer of butadiene and glycidyl methacrylate (75/25 Wt.% charge; ML/4 at 100° C=115), which was prepared using the conditions described in Example I, was added to several rubber blend compositions in a Banbury using the following recipe:

RECIPE D

| MATERIAL | WT. PARTS | |
|---|---|---|
| Rubber | 100.0 | |
| HAF Carbon Black | 65.0 | Banbury |
| Aromatic Processing Oil | 25.0 | 5 min. |
| Zinc Oxide | 3.0 | 50 RPM |
| Stearic Acid | 1.0 | |
| Diaminodiphenyldisulfide | 0 or 1.0 | |

The samples were molded and tested as described in Example I. Table III sets forth various stress-strain data obtained from the compositions prepared according to Recipe D. The data indicates that the addition of a butadiene/glycidyl methacrylate copolymer and diaminodiphenyldisulfide to a blend of Natsyn 200, Budene 501, and chlorobutyl during Banbury mixing (Example B) produces a significant increase in modulus values and stress at break. A similar addition (Example B) in the absence of epoxy cross-linking agents produces a slight decrease in modulus and stress at break data.

The addition of a butadiene/glycidyl methacrylate copolymer and diaminodiphenyldisulfide to a blend of Natsyn 200, SBR 1712, and EPDM during Banbury mixing (Example D) produces a significant increase in modulus values. A similar addition (Example D) in the absence of epoxy cross-linking agents produces a smaller increase in modulus values.

TABLE III

STRESS-STRAIN DATA

| EX. | RUBBERS, WT.PARTS | DIAMINO-DIPHENYL-DISULFIDE, phr | MODULUS AT ELONGATION OF 100% | 300% | 500% | BREAK STRESS | ELONGA-TION, % |
|---|---|---|---|---|---|---|---|
| A | Natsyn 200[a], 30 | — | — | — | — | — | — |
|   | Budene 501[b], 40 | 0 | 52 | 48 | 38 | 33 | 560 |
|   | Chlorobutyl[c], 30 | — | — | — | — | — | — |
| B | Natsyn 200, 25 | 0 | 52 | 40 | 30 | 16 | 570 |
|   | Budene 501, 40 | — | — | — | — | — | — |
|   | Chlorobutyl, 30 | 1.0 | 78 | 88 | — | 75 | 360 |
| C | Natsyn 200, 35 | — | — | — | — | — | — |
|   | SBR 1712, 35 | 0 | 81 | 114 | 118 | — | — |
|   | EPDM[e], 30 | — | — | — | — | — | — |
| D | Natsyn 200, 30 | — | — | — | — | — | — |
|   | SBR 1712, 35 | 0 | 127 | 189 | 179 | 149 | 630 |
|   | EPDM, 30 | 1.0 | 153 | 257 | 227 | 200 | 530 |
|   | Copolymer, 5 | — | — | — | — | — | — |

[a]High cis-1,4-polyisoprene; i.e. 95% or more of the repeating units are in the cis configuration, (Goodyear Tire & Rubber Company).
[b]High cis-1,4-polybutadiene; i.e. 90% or more of the repeating units are in the cis configuration, (Goodyear Tire & Rubber Company).
[c]Butyl HT 10–55; Enjay.
[d]Butadiene/glycidyl methacrylate copolymer.
[e]Royalene 301T; Uniroyal.

EXAMPLE IV

A terpolymer of butadiene, styrene, and glycidyl methacrylate (75/20/5 Wt.% charge) and a copolymer of butadiene and glycidyl methacrylate (75/25 Wt. % charge), which were prepared using the conditions described in Example I, were added to Natsyn 200 in a Banbury using the following recipe:

RECIPE E

| MATERIAL | WT. PARTS |   |
|---|---|---|
| Rubber | 100.0 |   |
| HAF Carbon Black | 25.0 | Banbury |
| Zinc Oxide | 3.0 | 5 min. |
| Stearic Acid | 2.0 | 50 RPM |
| Diaminodiphenyldisulfide | 0 or 1.0 |   |

Figure 2:
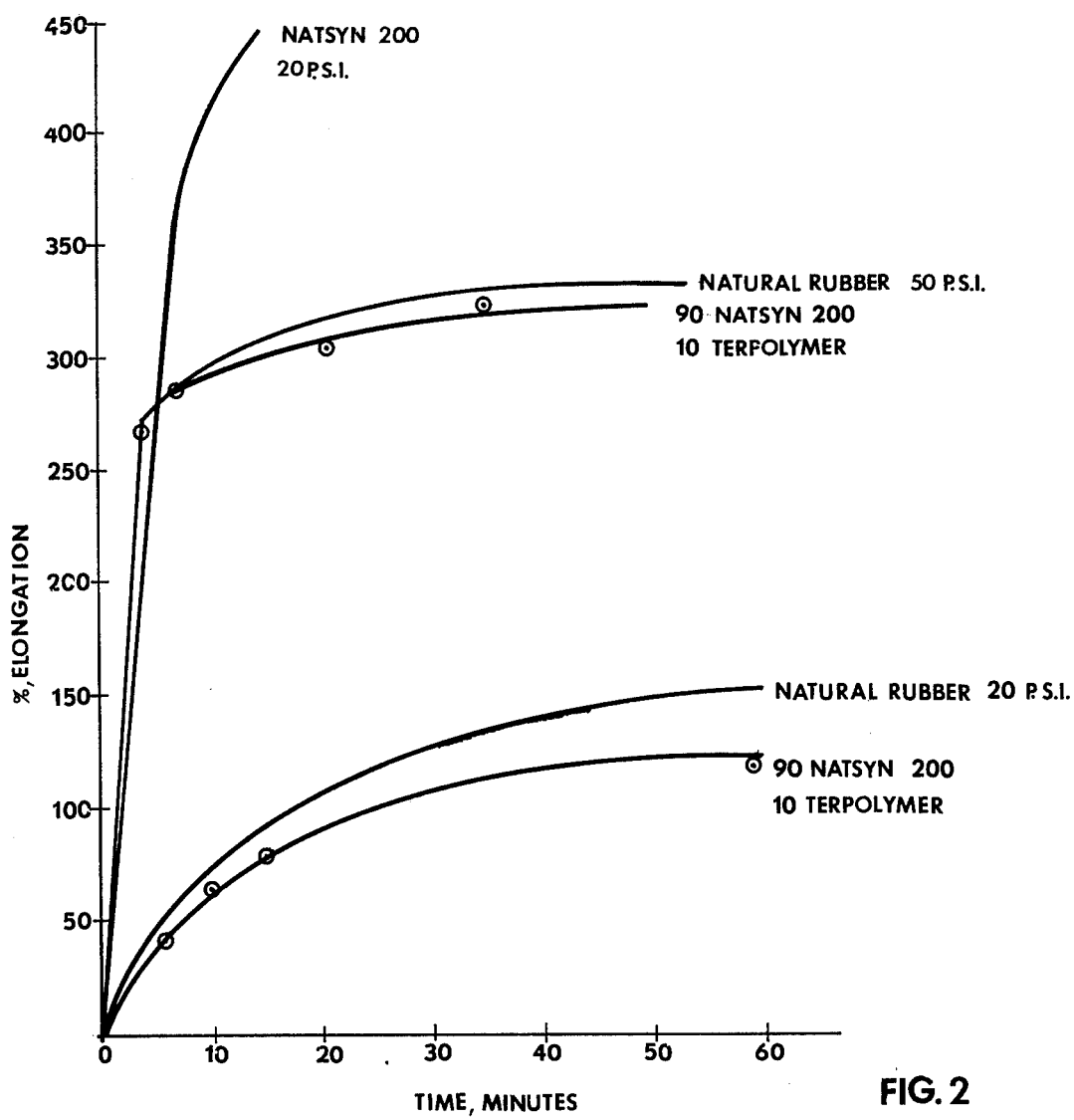
FIG. 2 is a graph showing the creep of interpolymers of the present invention compared to synthetic cis-1,4-polyisoprene and natural rubber.

The stress-strain data for blends containing 90 parts of Natsyn 200, 10 parts of terpolymer or copolymer, and 1 part of diaminodiphenyldisulfide are compared with those of compositions containing 100 parts Natsyn 200 and 100 parts natural rubber. (FIG. I). The data indicates that the stress-strain behavior of the blend compositions are very similar to that observed for natural rubber. This suggests a convenient method for improving the green strength of synthetic high cis-1,4-polyisoprene such that its stress-strain behavior is quite similar to that of natural rubber which inherently possesses good green strength. The composition of the copolymer and terpolymer in FIGS. 1 and 2 is the same as set forth in Example IV.

Creep data is shown in FIG. II, which compares the creep properties of the blend containing 90 parts of Natsyn 200, 10 parts of terpolymer, and 1 part of diaminodiphenyldisulfide with that of Natsyn 200 and natural rubber. The blend composition shows similar creep behavior under loads of 20 or 50 psi as compared to natural rubber; whereas the Natsyn 200 exhibits poor creep behavior under the 20 psi load conditions. Thus, the blends of the present invention have stress-strain and creep behavior similar to natural rubber and thus can be freely substituted therefore.

While in accordance with the patent statutes, preferred embodiments have been illustrated and described in detail, it is to be understood that the invention is not limited thereto, the scope of the invention being measured by the scope of the attached claims.

What is claimed is:

1. A process, comprising:
    forming a synthetic elastomer interpolymer having improved green strength by reacting at least one type of a synthetic elastomer forming monomer with an epoxy containing monomer,
    said synthetic elastomer forming monomer selected from the class consisting of at least one type of a conjugated diene monomer having from 4 to 10 carbon atoms, and at least one type of an olefin monomer having from 2 to 14 carbon atoms in combination with at least one type of a conjugated diene monomer having from 4 to 10 carbon atoms,
    said epoxy containing monomer selected from the class of compounds having the formula

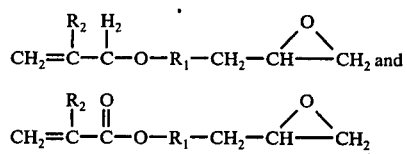

where $R_2$ contains from 1 to 4 carbon atoms and $R_1$ contains from 0 to 8 carbon atoms,
    the amount of said epoxy compound in said interpolymer ranging from about 0.5 percent to about 75 percent by weight based upon the total weight of said interpolymer,
    partially cross-linking said interpolymer to improve the green strength of said interpolymer by adding and reacting from 0.1 to 2.0 parts by weight based upon 100 parts of said interpolymer of an epoxy cross-linking agent, said epoxy cross-linking agent selected from the class consisting of monoamines, polyamines, monoanhydrides, monocarboxylic acids and polycarboxylic acids,
    said monoamines and said polyamines selected from the class consisting of an aliphatic containing from 1 to 16 carbon atoms, a cycloaliphatic containing from 4 to 6 carbon atoms, an aromatic containing from 6 to 16 carbon atoms, and combinations thereof, said monoanhydrides selected from the class consisting of an aliphatic containing from 1 to 30 carbon atoms, a cycloaliphatic containing from 4 to 30 carbon atoms, an aromatic containing from 6 to 30 carbon atoms, and combinations thereof, and
said monocarboxylic acids and said polycarboxylic acids selected from the class consisting of an aliphatic containing from 1 to 30 carbon atoms, an aromatic containing from 6 to 30 carbon atoms, and combinations thereof.

2. A process according to claim 1, wherein $R_2$ is 1 or 2 carbon atoms and $R_1$ is from 0 to 4 carbon atoms.

3. A process according to claim 2, wherein said synthetic elastomer monomers are selected from the class consisting of butadiene, isoprene, piperylene, mixtures of isoprene and butadiene, mixtures of butadiene and piperylene, mixtures of styrene and butadiene, and mixtures of alpha-methylstyrene and butadiene.

4. A process according to claim 3, wherein said epoxy cross-linking agent is selected from the class consisting of said monoamines and said polyamines.

5. A process according to claim 4, wherein the amount of said epoxy compound in said interpolymer ranges from about 1 percent to about 25 percent by weight and $R_2$ is 1 carbon atom and $R_1$ is 0 carbon atoms.

6. A process according to claim 5, wherein said cross-linking agents are selected from the class consisting of pentamethylenediamine, triethylenetetramine, diethylaminopropylamine, tetraethylene pentamine, menthane diamine, 4,4'-diaminodiphenyl sulfone, 4,4'-methylenebis(2-carbomethoxy) aniline, 4,4'-methylenebis aniline, diaminodiphenyldisulfide and benzene tetracarboxylic anhydride.

7. A process according to claim 6, wherein said amount of cross-linking agent ranges from about 0.1 to about 0.5 parts.

8. A process according to claim 1, wherein said cross-linked interpolymer is compounded.

9. A process according to claim 7, wherein said cross-linked interpolymers is compounded.

10. A process comprising:
forming a synthetic elastomer interpolymer having improved green strength from at least one type of a synthetic elastomer forming monomer and from an epoxy containing monomer,
said synthetic elastomer forming monomer selected from the class consisting of at least one type of a conjugated diene monomer having from 4 to 10 carbon atoms, and at least one type of an olefin monomer having from 2 to 14 carbon atoms in combination with at least one type of a conjugated diene monomer having from 4 to 10 carbon atons,
said epoxy containing monomer selected from the class of compounds having the formula:

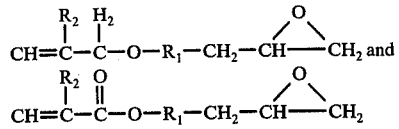

where $R_2$ contains from 1 to 4 carbon atoms and $R_1$ contains from 0 to 8 carbon atoms,
the amount of said epoxy compound in said interpolymer ranging from about 0.5 percent to about 75 percent by weight based upon the total weight of said interpolymer,
improving the green strength of an elastomer selected from the class consisting of synthetic elastomers and natural rubber by adding said interpolymer to form a blend,
the amount of said epoxy containing interpolymer in said blend ranging from about 2 percent to about 98 percent by weight based upon the total weight of said blend,
said synthetic elastomers selected from the class consisting of nitrile rubber, butyl rubber, chlorinated butyl rubber brominated butyl rubber, polyalkenylenes, ethylene-propylene-diene rubber, polymers made from at least one type of a conjugated diene monomer having from 4 to 10 carbon atoms, and polymers made from at least one type of an olefin monomer having from 2 to 14 carbon atoms in combination with at least one type of a conjugated diene monomer having from 4 to 10 carbon atoms.

11. A process according to claim 1, including further improving green strength by adding from about 0.5 to about 10 parts by weight based upon 100 parts of said interpolymer of an epoxy cross-linking agent to selectively cross-link said interpolymer blend, said epoxy cross-linking agent is selected from the class consisting of monoamines, polyamines monoanhydrides, monocarboxylic acids and polycarboxylic acids, said monoamines and said polyamines selected from the class consisting of an aliphatic containing from 1 to 16 carbon atoms, a cycloaliphatic containing from 4 to 6 carbon atoms, an aromatic containing from 6 to 16 carbon atoms and combinations thereof, said monoanhydrides selected from the class consisting of an aliphatic containing from 1 to 30 carbon atoms, a cycloaliphatic containing from 4 to 30 carbon atoms, an aromatic containing from 6 to 30 carbon atoms and combinations thereof, and said monocarboxylic acids and said polycarboxylic acids selected from the class consisting of an aliphatic containing from 1 to 30 carbon atons, an aromatic containing from 6 to 30 carbon atoms and combinations thereof.

12. A process according to claim 11, wherein $R_2$ is 1 or 2 carbon atoms and $R_1$ is from 0 to 8 carbon atoms.

13. A process according to claim 12, wherein said synthetic elastomer monomers forming said interpolymer are selected from the class consisting of butadiene, isoprene, piperylene, mixtures of isoprene and butadiene, mixtures of butadiene and piperylene, mixtures of styrene and butadiene, and mixtures of alpha-methylstyrene and butadiene.

14. A process according to claim 13, wherein the amount of epoxy containing compound in said interpolymer ranges from about 1 percent to about 25 percent by weight and wherein the amount of said epoxy cross-linking agent ranges from about 0.5 to about 2 parts by weight per 100 parts of said interpolymer.

15. A process according to claim 14, wherein $R_2$ is 1 carbon atom and $R_1$ is hydrogen, said epoxy containing interpolymer ranges from about 2 percent to about 50 percent by weight based upon the total weight of said blend and said epoxy cross-linking agents are selected from the class consisting of pentamethylenediamine, triethylenetetramine, diethylaminopropylamine, tetraethylene pentamine, menthane diamine, 4,4'-diaminodiphenyl sulfone, 4,4'-methylenebis (2-carbomethoxy) aniline, 4,4'-methylenebis aniline, diaminodiphenyldisulfide and benzene tetracarboxylic anhydride.

16. A process according to claim 15, wherein said blend polymers are selected from the class consisting of high cis-1,4-polyisoprene, high cis-1,4-polybutadiene, EPDM, and styrene-butadiene rubber.

17. A process according to claim 10, wherein said blend is compounded.

18. A process according to claim 11, wherein said blend is compounded.

19. A process according to claim 16, wherein said blend is compounded.

20. A process comprising:
forming an interpolymer synthetic elastomer having improved green strength from at least one type of a synthetic elastomer forming monomer and from an epoxy containing monomer,
said synthetic elastomer forming monomer selected from the class consisting of at least one type of a conjugated diene monomer having from 4 to 10 carbon atoms, and at least one type of an olefin monomer having from 2 to 14 carbon atoms in combination with at least one type of a conjugated diene monomer having from 4 to 10 carbon atoms,
said epoxy containing monomer selected from the class of compounds having the formula:

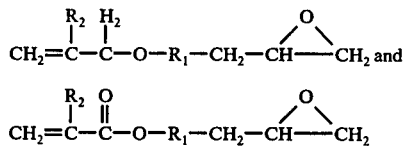

where $R_2$ contains from 1 to 4 carbon atoms and $R_1$ contains from 0 to 8 carbon atoms,
the amount of said epoxy compound in said interpolymer ranges from about 0.5 percent to about 75 percent by weight based upon the total weight of said interpolymer,
improving the green strength of an elastomer selected from the class consisting of synthetic elastomers and natural rubber by adding said interpolymer to form a blend, and
said synthetic elastomer being polymers made from at least one type of a conjugated diene monomer having from 4 to 10 carbon atoms.

21. A process according to claim 20, including further improving green strength by adding from about 0.5 to about 10 parts by weight based upon 100 parts of said interpolymer of an epoxy cross-linking agent to selectively cross-link said interpolymer blend, said epoxy cross-linking agent is selected from the class consisting of monoamines, polyamines, monoanhydrides, monocarboxylic acids and polycarboxylic acids, said monoamines and said polyamines selected from the class consisting of an aliphatic containing from 1 to 16 carbon atoms, a cycloaliphatic containing from 4 to 6 carbon atoms, an aromatic containing from 6 to 16 carbon atoms and combinations thereof, said monoanhydrides selected from the class consisting of an aliphatic containing from 1 to 30 carbon atoms, a cycloaliphatic containing from 4 to 30 carbon atoms, an aromatic containing from 6 to 30 carbon atoms and combinations thereof, and said monocarboxylic acids and said polycarboxylic acids selected from the class consisting of an aliphatic containing from 1 to 30 carbon atoms, an aromatic containing from 6 to 30 carbon atoms and combinations thereof.

22. A process according to claim 21, wherein $R_2$ is 1 or 2 carbon atoms and $R_1$ is from 0 to 8 atoms.

23. A process according to claim 22, wherein said synthetic elastomer monomers forming said interpolymers are selected from the class consisting of butadiene, isoprene, piperylene, mixtures of isoprene and butadiene, mixtures of butadiene and piperylene, mixtures of styrene and butadiene, and mixtures of alpha-methylstyrene and butadiene.

24. A process according to claim 23, wherein the amount of epoxy containing compound in said interpolymer ranges from about 1 percent to about 25 percent by weight and wherein the amount of said epoxy cross-linking agent ranges from about 0.5 to about 2 parts by weight per 100 parts of said interpolymer.

25. A process according to claim 24, wherein $R_2$ is 1 carbon atom and $R_1$ is hydrogen, said epoxy containing interpolymer ranges from about 2 percent to about 50 percent by weight based upon the total weight of said blend and said epoxy crosslinking agents are selected from the class consisting of pentamethylenediamine, triethylenetetramine, diethylaminopropylamine, tetraethylene, pentamine, methane diamine, 4,4'-diaminodiphenyl sulfone, 4,4'-methylenebis(2-carbomethoxy) aniline, 4,4'-methylenebis aniline, diaminodiphenyldisulfide and benzene tetracarboxylic anhydride.

26. A process according to claim 25, wherein said blend polymers are selected from the class consisting of high cis-1,4-polyisoprene and high cis-1,4-polybutadiene.

27. A process according to claim 20, wherein said blend is compounded.

28. A process according to claim 21, wherein said blend is compounded.

29. A process according to claim 26, wherein said blend is compounded.

* * * * *

UNITED STATES PATENT OFFICE
CERTIFICATE OF CORRECTION

PATENT NO. : 4,094,831
DATED : June 13, 1978
INVENTOR(S) : Paul H. Sandstrom

It is certified that error appears in the above-identified patent and that said Letters Patent are hereby corrected as shown below:

Column 5, Lines 41 and 42
   Delete "nadic methyl anhydride, dodecenylsuccinic anhydride."

Column 6, Line 21.
   "when" should be "then".

Column 11, Table III, Under B, following "Chlorobutyl, 30";
   "Copolymer (d)., 5" was omitted Signed and Sealed this Twenty-first Day of June 1983

[SEAL]

Attest:

DONALD J. QUIGG

Attesting Officer

Acting Commissioner of Patents and Trademarks